(12) United States Patent
Kito et al.

(10) Patent No.: US 8,083,627 B2
(45) Date of Patent: Dec. 27, 2011

(54) AUTOMATIC TRANSMISSION

(75) Inventors: Masashi Kito, Anjo (JP); Norihiro Tokunaga, Nishio (JP); Hiroshi Kato, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 382 days.

(21) Appl. No.: 12/461,330

(22) Filed: Aug. 7, 2009

(65) Prior Publication Data

US 2010/0044184 A1    Feb. 25, 2010

(30) Foreign Application Priority Data

Aug. 22, 2008 (JP) ................... 2008-214693

(51) Int. Cl.
*F16H 31/00* (2006.01)
*F16D 21/00* (2006.01)
*F16D 25/0638* (2006.01)
*F16D 25/12* (2006.01)

(52) U.S. Cl. ............... 475/146; 192/48.619; 192/85.25; 192/106 F

(58) Field of Classification Search .............. 475/116, 475/146; 192/48.619, 85.25, 106 F
See application file for complete search history.

(56) References Cited

U.S. PATENT DOCUMENTS

| | | | |
|---|---|---|---|
| 4,957,195 A | 9/1990 | Kano et al. | |
| 5,887,690 A | 3/1999 | Haupt | |
| 6,110,069 A | * 8/2000 | Taniguchi et al. | 475/330 |
| 7,001,301 B2 | * 2/2006 | Wittkopp | 475/146 |
| 2005/0067251 A1 | * 3/2005 | Braford et al. | 192/70.12 |
| 2007/0184932 A1 | 8/2007 | Tabata et al. | |
| 2009/0082155 A1 | 3/2009 | Kato | |
| 2009/0114500 A1 | 5/2009 | Kato et al. | |

FOREIGN PATENT DOCUMENTS

| | | |
|---|---|---|
| JP | A-1-210624 | 8/1989 |
| JP | A-7-269665 | 10/1995 |
| JP | B2 2957184 | 7/1999 |
| JP | B2-3636467 | 4/2005 |
| JP | A-2005-273768 | 10/2005 |
| JP | U-3121527 | 5/2006 |
| JP | A 2006-234060 | 9/2006 |
| JP | A-2006-342845 | 12/2006 |
| JP | A-2007-32624 | 2/2007 |

OTHER PUBLICATIONS

International Search Report dated Nov. 24, 2009 for U.S. National Phase Application No. PCT/JP2009/003172.

* cited by examiner

*Primary Examiner* — Edwin A Young
(74) *Attorney, Agent, or Firm* — Oliff & Berridge, PLC

(57) ABSTRACT

An automatic transmission includes first and second clutches, a clutch drum, a piston, a plurality of friction plates, a hydraulic oil chamber, a cancel oil chamber, a return spring, and a cancel plate, wherein a plate member that forms a cylinder portion of the hydraulic oil chamber is provided between the piston and the clutch drum of the first clutch that is located on an inner diameter side, and an oil passage that supplies an oil to the cancel oil chamber of the second clutch that is located on an outer diameter side is formed between the clutch drum and the plate member.

8 Claims, 5 Drawing Sheets

FIG.2

|      | C1 | C2 | C3 | C4 | B1 | B2  | F1 |
|------|----|----|----|----|----|-----|----|
| 1st  | ●  |    |    |    |    | (●) | ●  |
| 2nd  | ●  |    |    |    | ●  |     |    |
| 3rd  | ●  |    | ●  |    |    |     |    |
| 4th  | ●  |    |    | ●  |    |     |    |
| 5th  | ●  | ●  |    |    |    |     |    |
| 6th  |    | ●  |    | ●  |    |     |    |
| 7th  |    | ●  | ●  |    |    |     |    |
| 8th  |    | ●  |    |    | ●  |     |    |
| Rev1 |    |    | ●  |    |    | ●   |    |
| Rev2 |    |    |    | ●  |    | ●   |    |

(●): DURING ENGINE BRAKING

US 8,083,627 B2

AUTOMATIC TRANSMISSION

INCORPORATION BY REFERENCE

The disclosure of Japanese Patent Application No. 2008-214693 filed on Aug. 22, 2008 including the specification, drawings and abstract is incorporated herein by reference in its entirety.

BACKGROUND OF THE INVENTION

The present invention relates to an automatic transmission which is mounted on, for example, a vehicle. More particularly, the present invention relates to an automatic transmission having two clutches provided at different radial positions so as to axially overlap each other.

In recent years, a multi-speed automatic transmission, such as an automatic transmission with eight forward speeds, has been increasingly developed as an automatic transmission to be mounted on a vehicle, from the standpoint of improving fuel consumption and emission of the vehicle. Moreover, many components, such as clutches, are required to be compactly arranged, from the standpoint of vehicle mountability.

In an automatic transmission of a related art, two clutches, having one of input and output members in common and the other of the input and output members not in common, are disposed at different radial positions so as to axially overlap each other, in order to make the automatic transmission compact, especially in the axial direction (see, for example, Japanese Patent Application Publication No. JP-A-H07-269665). In these two clutches, multiple friction plates, a hydraulic servo for engaging and disengaging the friction plates, and a cancel oil chamber for cancelling a centrifugal oil pressure of a hydraulic oil pressure chamber of a piston are disposed so as to axially overlap each other.

An oil is directly supplied to the cancel oil chamber on the inner diameter side of the above two cancel oil chambers through an oil gallery formed in a boss portion of a clutch drum, and the oil in the cancel oil chamber on the inner diameter side is supplied to the cancel oil chamber on the outer diameter side through the piston and an oil gallery formed in the clutch drum of the clutch on the inner diameter side.

SUMMARY OF THE INVENTION

These two clutches are structured so as to axially overlap each other in a two-story fashion, and in order to supply the oil from the cancel oil chamber on the inner diameter side to the cancel oil chamber on the outer diameter side, the oil is supplied to the cancel oil chamber on the outer diameter side through the piston and the oil gallery formed in the clutch drum. However, in order to form this oil passage, the piston needs to be provided with two O-rings with the oil passage interposed therebetween to prevent oil leakage. Moreover, these O-rings need to be provided at a fixed distance in the axial direction so that the O-ring provided in the sliding piston does not reach the oil gallery.

Thus, even if the axial length is reduced by the two-story structure, in the case where the oil passage is formed between members that move relative to each other, that is, between the piston and the clutch drum serving as a cylinder of the piston, the members that move relative to each other need to have a large axial length, and seal members, such as the O-rings, for sealing the oil passage need to be disposed with a margin in the axial direction in order to prevent the seal members from reaching the oil gallery by relative movement of one of the members. This hinders reduction in size of the clutches and the automatic transmission.

It is therefore an object of the present invention to provide an automatic transmission which solves the above problem by providing a plate member between a piston and a clutch drum of a clutch on an inner diameter side, and supplying an oil to a cancel oil chamber of a clutch on an outer diameter side via an oil passage formed between the plate member and the clutch drum.

An automatic transmission according to a first aspect of the present invention includes first and second clutches provided at different radial positions so as to axially overlap each other. Each of the first and second clutches includes a clutch drum, a piston disposed in the clutch drum, a plurality of friction plates engaging with the clutch drum, a hydraulic oil chamber of the piston, a cancel oil chamber that is provided so as to face the hydraulic oil chamber with the piston interposed therebetween, and cancels a centrifugal oil pressure that is applied to the hydraulic oil chamber, a return spring that biases the piston toward the hydraulic oil chamber, and a cancel plate that forms the cancel oil chamber between the cancel plate and the piston, and receives a reaction force of the return spring. The automatic transmission is characterized in that a plate member that forms a cylinder portion of the hydraulic oil chamber is provided between the piston and the clutch drum of the first clutch that is located on an inner diameter side, and an oil passage that supplies an oil to the cancel oil chamber of the second clutch that is located on an outer diameter side is formed between the clutch drum and the plate member (32).

Thus, the first clutch and the second clutch are provided at different radial positions so as to axially overlap each other, the plate member is provided between the piston and the clutch drum of the first clutch that is located on the inner diameter side, and the oil is supplied to the cancel oil chamber of the second clutch that is located on the outer diameter side, via the oil passage between the plate member and the clutch drum which serve as fixing members. Thus, as compared to, for example, the case of forming an oil passage in a member that makes a relative movement, such as a piston, the number of seal members is reduced, and the seal members need not to be disposed with a margin in the axial length in consideration of the relative movement of the seal members. Thus, the axial dimension of the components can be reduced, whereby the axial dimension of the clutch and the automatic transmission can be reduced.

Moreover, more specifically, the clutch drum of the first clutch has a boss portion, a flange portion extended from the boss portion to a circumferential direction, a cylindrical portion extending from the flange portion to an axial direction, and a drum portion with which the friction plates spline-engage on a tip side of the cylindrical portion. The piston and the cancel plate, which form the cancel oil chamber of the second clutch, are provided on an outer periphery of the cylindrical portion.

Thus, since the cancel oil chamber of the second clutch is provided on the outer periphery of the cylindrical portion of the clutch drum of the first clutch, the first clutch and the second clutch are disposed adjacent to each other, and the oil passage to the cancel oil chamber of the second clutch can be easily formed.

Moreover, more specifically, the clutch drum of the first clutch has the drum portion located on an outer diameter side as compared to the cylindrical portion, and has a step portion between the drum portion and the cylindrical portion. The cancel plate of the second clutch is latched by being pressed against the step portion between the drum portion and the cylindrical portion.

Thus, in the clutch drum of the first clutch, the drum portion is located on the outer diameter side as compared to the cylindrical portion, the step portion is formed between the drum portion and the cylindrical portion, and the cancel plate of the second clutch is latched by being pressed against the step portion. This eliminates the need for a restricting member, such as a snap ring for latching the cancel plate, whereby the axial dimension of the clutch can be reduced accordingly.

Moreover, more specifically, the drum portion and the cylindrical portion of the clutch drum of the first clutch are formed separately, and the drum portion is latched to the cylindrical portion by a restricting member.

Thus, even if a large pressing force is applied to the drum portion of the clutch drum of the first clutch by a centrifugal oil pressure of the cancel oil chamber of the second clutch, the connection portion between the drum portion and the cylindrical portion serves as a fulcrum of the moment force that is applied to the clutch drum. Thus, a change in posture of the drum portion can be reduced, and the moment force that is applied to the clutch drum of the first clutch can be reduced, whereby deformation of the clutch drum of the first clutch can be prevented.

Moreover, more specifically, the oil passage has a gap between the clutch drum of the first clutch and the plate member, an oil gallery that is formed in the boss portion of the clutch drum, and supplies the oil to the gap, and an oil gallery that is formed in the cylindrical portion of the clutch drum, and supplies the oil from the gap to the cancel oil chamber of the second clutch.

Thus, the use of the gap between the plate member and the clutch drum of the first clutch as an oil passage enables the oil to be supplied to the cancel oil chamber of the second clutch in a simple structure. Moreover, since the oil is supplied through the gap extending in a planar manner, the space for supplying the oil can be short in the axial direction, whereby the axial dimension of the clutches can further be reduced.

Moreover, more specifically, the clutch drum of the first clutch is formed so that the cylindrical portion and the flange portion have a larger thickness than that of the plate member.

Thus, since the plate member is provided on the clutch drum of the first clutch having high rigidity, the thickness of the plate member can be reduced, and the axial dimension of the clutches can be reduced.

Moreover, more specifically, the plate member is welded to the cylindrical portion of the clutch drum of the first clutch.

Thus, since the plate member is welded to the cylindrical portion of the clutch drum of the first clutch, the cylindrical portion, which is desired to be formed with a large thickness in order to dispose an O-ring and the like, need not be cut, whereby high rigidity of the clutch drum can be maintained.

Moreover, more specifically, the plate member is press-formed so as to have a first protrusion protruding toward the piston, and a second protrusion protruding toward the clutch drum, and the first and second protrusions are disposed at different positions on a same diameter in a phase-shifted manner.

Thus, since the first and second protrusions of the plate member are disposed in a phase-shifted manner so as to be located at different positions on the same diameter, the plate member as a cylinder member and the piston can be prevented from sticking to each other, and the clearance of the oil passage formed between the plate member and the flange portion can be ensured, both only by simple press working.

BRIEF DESCRIPTION OF THE DRAWINGS

FIG. 2 is an engagement table of the automatic transmission shown in FIG. 1;

DETAILED DESCRIPTION OF THE EMBODIMENTS

Figure 1:
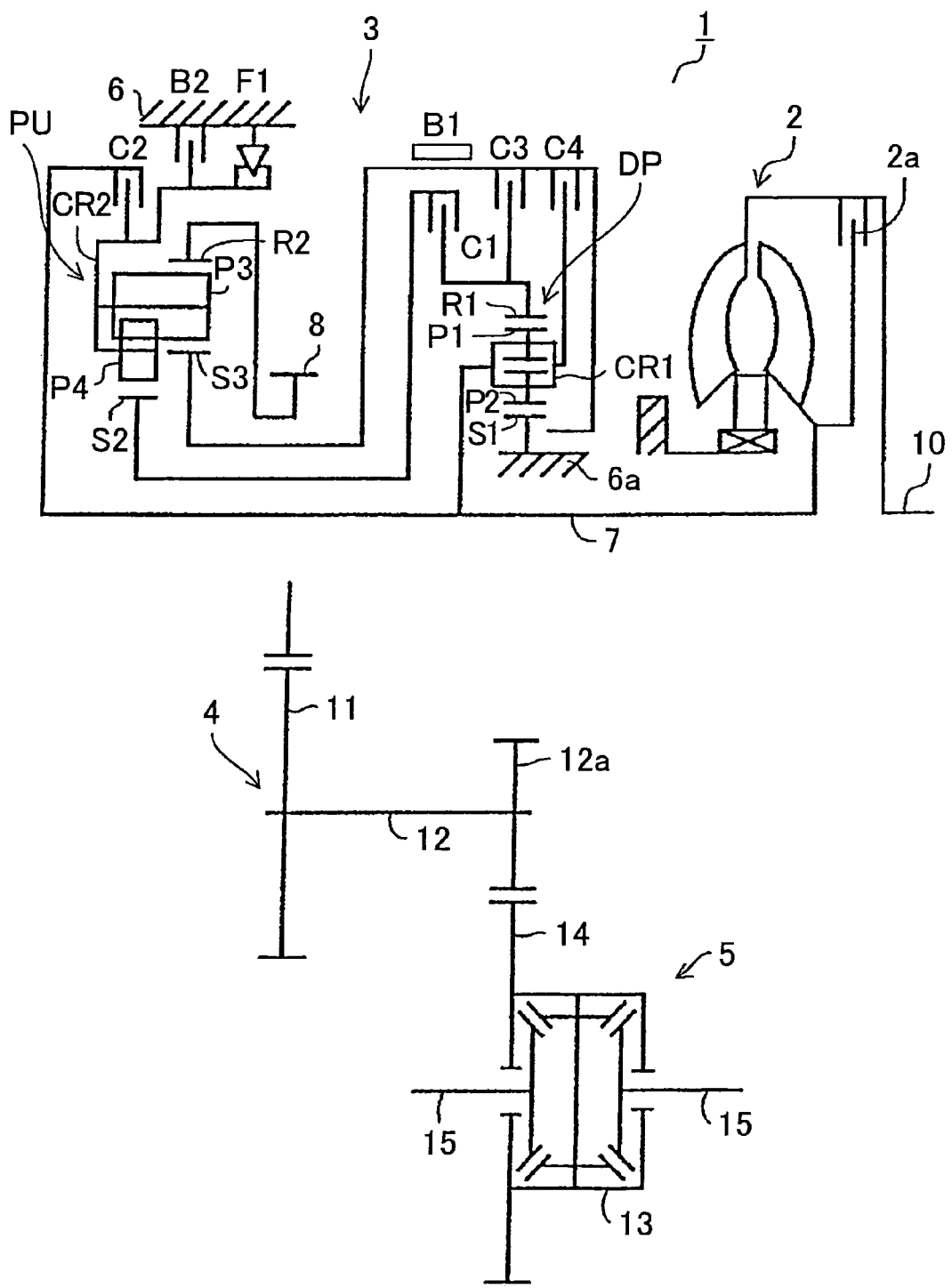
FIG. 1 is a skeleton diagram of an automatic transmission according to a first embodiment of the present invention.

Hereinafter, embodiments of the present invention will be described with reference to the accompanying drawings.

First Embodiment

An automatic transmission of the present invention is an automatic transmission that is suitable for being mounted on a vehicle such as a FF (front engine, front drive) type vehicle. Although the lateral direction in FIGS. 1, 3, and 4 corresponds to the lateral direction when mounted on a vehicle, the right side in the drawings, which is the driving source side such as an engine, is herein referred to as the "front side" or "forward," and the left side in the drawings is referred to as the "rear side" or "rearward," for convenience of description.

First, a schematic structure of an automatic transmission 1, to which the present invention can be adapted, will be described below with reference to FIG. 1. As shown in FIG. 1, the FF-type automatic transmission 1 includes a case 6 which is formed by a housing case and a mission case, and on the front side of the case 6, has an input member (a front cover and a centerpiece) 10 as the automatic transmission 1 which can be connected to an engine which is not shown. The automatic transmission 1 is provided with a torque converter 2 having a lockup clutch 2a, and is also provided with a speed change mechanism 3, a counter shaft portion 4, and a differential portion 5 in the mission case 6.

The torque converter 2 is provided on an axis about an input shaft 7 of the speed change mechanism 3, which is the same axis as that of an output shaft of the engine (not shown). Moreover, the counter shaft portion 4 is provided on the counter shaft 12 located on an axis parallel to the input shaft 7. The differential portion S is provided so as to have left and right axles 15, 15 on an axis parallel to the counter shaft 12.

The speed change mechanism 3 includes a planetary gear (a deceleration planetary gear) DP on the input shaft 7, and includes a planetary gear unit (a planetary gear set) PU on the rear side of the planetary gear DP.

The planetary gear DP is a so-called double-pinion planetary gear which includes a first sun gear S1, a first carrier CR1, and a first ring gear R1, and which has a pinion P2 which meshes with the first sun gear S1, and a pinion P1 which meshes with the first ring gear R1, in an intermeshing manner on the first carrier CR1.

On the other hand, the planetary gear unit PU is a so-called Ravigneaux type planetary gear which has a second sun gear S2, a third sun gear S3, a second carrier CR2, and a second ring gear R2 as four rotating elements, and which has a long pinion P3 which meshes with the third sun gear S3 and the second ring gear. R2, and a short pinion P4 which meshes with the second sun gear S2, in an intermeshing manner on the second carrier CR2.

The first sun gear S1 of the planetary gear DP is held stationary with respect to the case 6. Moreover, the first carrier CR1 is connected to the input shaft 7 and has the same rotation as that of the input shaft 7 (hereinafter referred to as "input rotation"), and is also connected to a fourth clutch (a first clutch) C4. Moreover, the first ring gear R1 provides reduced rotation, i.e., reduced input rotation, by the stationary sun gear S1 and the first carrier CR1 which has the input rotation, and is connected to a first clutch C1 and a third clutch (a second clutch) C3.

The third sun gear S3 of the planetary gear unit PU is connected to a first brake B1 so that the third sun gear S3 can be held stationary with respect to the case 6. Moreover, the third sun gear S3 of the planetary gear unit PU is connected to the fourth clutch C4 and the third clutch C3 so that the input rotation of the first carrier CR1 and the reduced rotation of the first ring gear R1 can be input to the third sun gear S3 through the fourth clutch C4 and the third clutch C3, respectively. Moreover, the second sun gear S2 is connected to the first clutch C1 so that the reduced rotation of the first ring gear R1 can be input to the second sun gear S2.

In addition, the second carrier CR2 is connected to a second clutch C2 to which the rotation of the input shaft 7 is input, so that the input rotation can be input to the second carrier CR2 via the second clutch C2. Moreover, the second carrier CR2 is connected to a one-way clutch F1 and a second brake B2 so that the rotation of the second carrier CR2 is restricted in one direction with respect to the case 6 by the one-way clutch F1, and so that the second carrier CR2 can be held stationary via the second brake B2. Moreover, the second ring gear R2 is connected to a counter gear 8 which is supported so as to be rotatable relative to a center support member fixed to the mission case 6.

Moreover, a large-diameter gear 11, which is fixed on the counter shaft 12 of the counter shaft portion 4, meshes with the counter gear 8, and a gear 14 of the differential portion 5 meshes with the counter shaft 12 via a small-diameter gear 12a formed on the outer peripheral surface of the counter shaft 12. The gear 14 is fixed to a differential gear 13, and is connected to the left and right axles 15, 15 via the differential gear 13.

Based on the above structure, operation of the speed change mechanism 3 will be described below with reference to FIGS. 1 and 2.

For example, at the first forward speed (1st) in the D (drive) range, as shown in FIG. 2, the first clutch C1 and the one-way clutch F1 are engaged. Thus, the rotation of the ring gear R1, which is reduced by the stationary first sun gear S1 and by the first carrier CR1 having the input rotation, is input to the second sun gear S2 via the first clutch C1. Moreover, the rotation of the second carrier CR2 is restricted to one direction (the normal rotation direction), that is, the reverse rotation of the second carrier CR2 is prevented, and the second carrier CR2 is held stationary. Thus, the reduced rotation, which has been input to the sun gear S2, is output to the second ring gear R2 via the stationary second carrier CR2, and normal rotation as the first forward speed is output from the counter gear 8.

Note that, during engine braking (during coasting), the second carrier CR2 is held stationary by latching the second brake B2, and thus, the normal rotation of the second carrier CR2 is prevented, whereby the state of the first forward speed is maintained. Moreover, at the first forward speed, the one-way clutch F1 prevents the reverse rotation of the second carrier CR2, and allows the normal rotation of the second carrier CR2. Thus, establishing the first forward speed when, for example, switching from a non-travel range to a travel range, can be implemented smoothly by automatic engagement of the one-way clutch F1.

At the second forward speed (2nd), the first clutch C1 is engaged, and the first brake B1 is latched. Thus, the rotation of the first ring gear R1, which is reduced by the stationary first sun gear S1 and by the first carrier CR1 having the input rotation, is input to the second sun gear S2 via the first clutch C1. Moreover, the third sun gear S3 is held stationary by the latching of the first brake B1. Thus, the rotation of the second carrier CR2 becomes reduced rotation having a lower rotational speed than the rotation of the second sun gear S2, whereby the reduced rotation, which has been input to the second sun gear S2, is output to the second ring gear R2 via the second carrier CR2, and normal rotation is output from the counter gear 8 as the second forward speed.

At the third forward speed (3rd), the first clutch C1 and the third clutch C3 are engaged. Thus, the rotation of the first ring gear R1, which is reduced by the stationary first sun gear S1 and by the first carrier CR1 having the input rotation, is input to the second sun gear S2 via the first clutch C1. Moreover, the reduced rotation of the first ring gear R1 is input to the third sun gear S3 by the engagement of the third clutch C3. That is, since the reduced rotation of the first ring gear R1 is input to the third sun gear S3 and the second sun gear S2, the planetary gear unit PU becomes directly coupled to the reduced rotation, and the reduced rotation is directly output to the second ring gear R2, whereby normal rotation as the third forward speed is output from the counter gear 8.

At the fourth forward speed (4th), the first clutch C1 and the fourth clutch C4 are engaged. Thus, the rotation of the first ring gear R1, which is reduced by the stationary first sun gear S1 and by the first carrier CR1 having the input rotation, is input to the second sun gear S2 via the first clutch C1. Moreover, the input rotation of the first carrier CR1 is input to the third sun gear S3 by the engagement of the fourth clutch C4. Thus, the rotation of the second carrier CR2 becomes reduced rotation having a higher rotational speed than the rotation of the second sun gear S2, and the reduced rotation, which has been input to the second sun gear S2, is output to the second ring gear R2 via the second carrier CR2, whereby normal rotation as the fourth forward speed is output from the counter gear 8.

At the fifth forward speed (5th), the first clutch C1 and the second clutch C2 are engaged. Thus, the rotation of the first ring gear R1, which is reduced by the stationary first sun gear S1 and by the first carrier CR1 having the input rotation, is input to the second sun gear S2 via the first clutch C1. Moreover, the input rotation is input to the second carrier CR2 by the engagement of the second clutch C2. Thus, reduced rotation, which has a higher rotational speed than the fourth forward speed due to the reduced rotation which has been input to the second sun gear S2, and the input rotation which has been input to the second carrier CR2, is output to the second ring gear R2, whereby normal rotation as the fifth forward speed is output from the counter gear 8.

At the sixth forward speed (6th), the second clutch C2 and the fourth clutch C4 are engaged. Thus, the input rotation of the first carrier CR1 is input to the third sun gear S3 by the engagement of the fourth clutch C4. Moreover, the input rotation is input to the second carrier CR2 by the engagement of the second clutch C2. That is, because the input rotation is input to the third sun gear S3 and the second carrier CR2, the planetary gear unit PU is directly coupled to the input rotation, and the input rotation is directly output to the second ring gear R2, whereby normal rotation as the sixth forward speed is output from the counter gear 8.

At the seventh forward speed (7th), the second clutch C2 and the third clutch C3 are engaged. Thus, the rotation of the first ring gear R1, which is reduced by the stationary first sun gear S1 and by the first carrier CR1 having the input rotation, is input to the third sun gear S3 via the third clutch C3. Moreover, the input rotation is input to the second carrier CR2 by the engagement of the second clutch C2. Thus, increased rotation, which has a slightly higher rotational speed than the input rotation due to the reduced rotation which has been input to the third sun gear S3 and the input rotation which has been input to the second carrier CR2, is output to the second ring gear R2. Thus, normal rotation as the seventh forward speed is output from the counter gear 8.

At the eighth forward speed (8th), the second clutch C2 is engaged, and the first brake B1 is latched. Thus, the input rotation is input to the second carrier CR2 by the engagement of the second clutch C2. Moreover, the third sun gear S3 is held stationary by the latching of the first brake B1. Thus, by the stationary third sun gear S3, the input rotation of the second carrier CR2 becomes increased rotation having a higher rotational speed than the seventh forward speed, and this increased rotation is output to the second ring gear R2. Thus, normal rotation is output from the counter gear 8 as the eighth forward speed.

At the first reverse speed (Rev1), the third clutch C3 is engaged, and the second brake B2 is latched. Thus, the rotation of the first ring gear R1, which is reduced by the stationary first sun gear S1 and by the first carrier CR1 having the input rotation, is input to the third sun gear S3 via the third clutch C3. Moreover, the second carrier CR2 is held stationary by the latching of the second brake B2. Thus, the reduced rotation, which has been input to the third sun gear S3, is output to the second ring gear R2 via the stationary second carrier CR2, and reverse rotation is output from the counter gear 8 as the first rearward speed.

At the second reverse speed (Rev2), the fourth clutch C4 is engaged, and the second brake B2 is latched. Thus, the input rotation of the first carrier CR1 is input to the third sun gear S3 by the engagement of the fourth clutch C4. Moreover, the second carrier CR2 is held stationary by the latching of the second brake B2. Thus, the input rotation, which has been input to the third sun gear S3, is output to the second ring gear R2 via the stationary second carrier CR2, and reverse rotation is output from the counter gear 8 as the second reverse speed.

Note that, in, for example, the P (parking) range and the N (neutral) range, the first clutch C1, the second clutch C2, the third clutch C3, and the fourth clutch C4 are released. Thus, the first carrier CR1 and the third sun gear S3 are disconnected from each other, and the first ring gear R1 is disconnected from the third sun gear S3 and the second sun gear S2. That is, the planetary gear DP and the planetary gear unit PU are disconnected from each other. Moreover, the input shaft 7 and the second carrier CR2 are disconnected from each other. Thus, power transmission between the input shaft 7 and the planetary gear unit PU is disconnected. That is, power transmission between the input shaft 7 and the counter gear 8 is disconnected.

Figure 3:
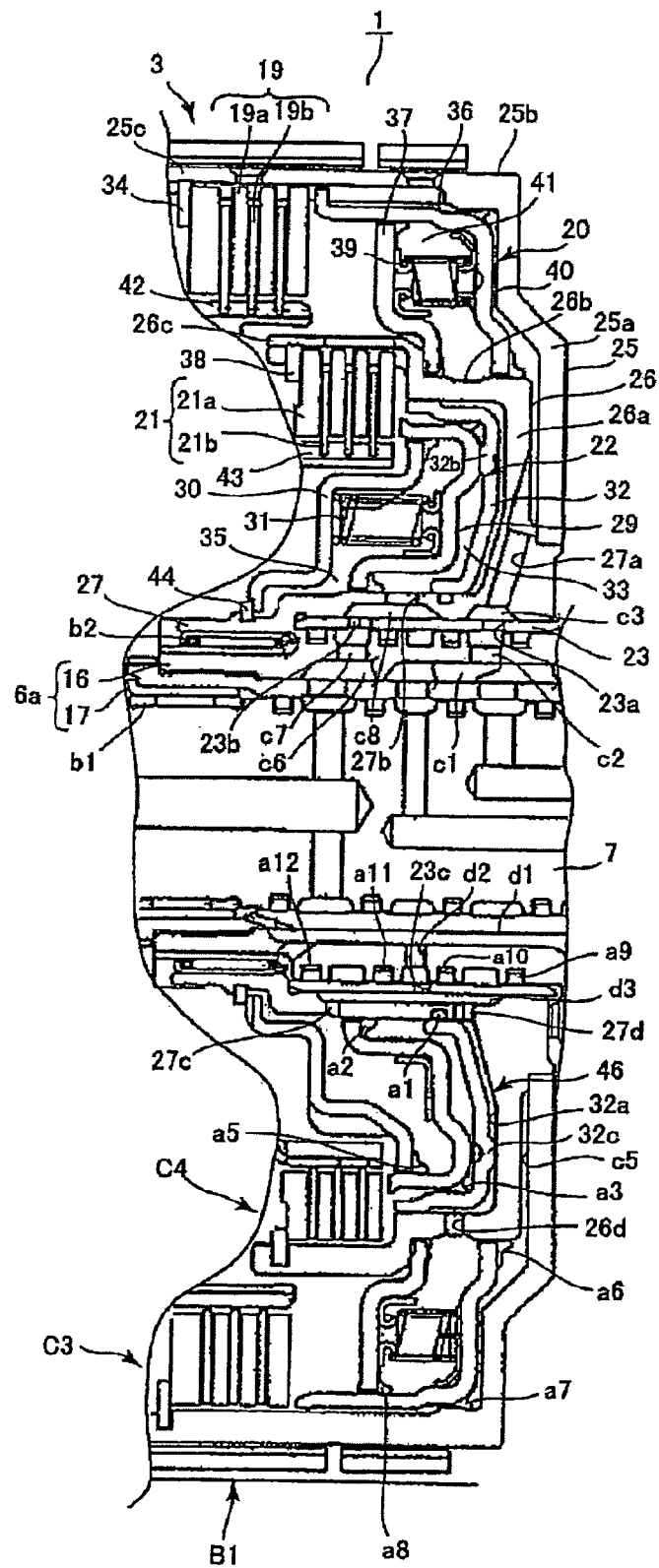
FIG. 3 is a partial enlarged cross-sectional view showing the automatic transmission according to the first embodiment of the present invention.

Next, the third clutch (the second clutch) C3 and the fourth clutch (the first clutch) C4 of the first embodiment of the present invention will be described with reference to FIG. 3.

In the automatic transmission 1, the third clutch C3 and the fourth clutch C4, which are provided so as to axially overlap each other, are provided in a front portion in the speed change mechanism 3, and are disposed between an oil pump (not shown) located on the rear side of the torque converter 2, and the planetary gear DP. In the radial direction, the third clutch C3 and the fourth clutch C4 are disposed on the outer peripheral side of a boss portion 6a which is extended from a body of the oil pump and is formed integrally with the case 6.

Note that, more specifically, the boss portion 6a is a portion in which a cylindrical portion 16 extended from the body of the oil pump, and a stator shaft 17 provided so as to extend through the inside of the oil pump to support a stator (not shown) of the torque converter 2, are formed integrally so that the cylindrical portion 16 and the stator shaft 17 fit each other. The input shaft 7 is supported on the inner peripheral side of the boss portion 6a (the stator shaft 17) via a bush b1 so as to be rotatable relative to the boss portion 6a Moreover, as described above, the first sun gear S1 is fixedly supported at a rear end of the boss portion 6a.

The fourth clutch C4 is located on the inner diameter side, and is disposed inward of the third clutch C3 located on the outer diameter side, so that the third clutch C3 and the fourth clutch C4 are provided in a two-story fashion. The third clutch C3, which is a multi-plate clutch, has a friction plate 19, which is formed by a plurality of outer friction plates 19a and inner friction plates 19b, and a hydraulic servo 20 for engaging and disengaging these friction plates 19. The fourth clutch C4, which is also a multi-plate clutch, has a friction plate 21, which is formed by a plurality of outer friction plates 21a and inner friction plates 21b, and a hydraulic servo 22 for engaging and disengaging the friction plate 21.

The friction plate 19 on the outer peripheral side is disposed so as to partially axially overlap the friction plate 21 on the inner peripheral side (when viewed from the radial direction). Moreover, the hydraulic servo 20 on the outer peripheral side and the hydraulic servo 22 on the inner peripheral side are disposed so as to axially overlap each other.

A clutch drum 25 of the third clutch C3 and a clutch drum 26 of the fourth clutch C4 are rotatably provided on the boss portion 6a with a bearing b2 and a sleeve member 23 interposed therebetween. The clutch drums 25, 26 of the third and fourth clutches C3, C4 are integrally formed with a boss portion 27 in common.

The clutch drums 25, 26 of the third and fourth clutches C3, C4 are formed by the common boss portion 27 described above, flange portions 25a, 26a which are extended from the boss portion 27 to the circumferential direction, cylindrical portions 25b, 26b which are respectively extended from the top of the flange portions 25a, 26a in the input shaft direction, and drum portions 25c, 26c which are respectively provided on the tip sides of the cylindrical portions 25b, 26b, and with which the outer friction plates 19a, 21a spline-engage, respectively.

The hydraulic servo 22 of the fourth clutch C4 is disposed on the outer peripheral side of the boss portion 27, and the hydraulic servo 20 of the third clutch C3 is disposed on the outer peripheral side of the cylindrical portion 26b of the fourth clutch C4.

The hydraulic servo 22 of the fourth clutch C4 has the clutch drum 26, a piston 29, a cancel plate 30, a return spring 31, and a plate member 32 which forms a cylinder of the piston 29. The hydraulic servo 22 forms a hydraulic oil chamber 33 between the piston 29 and the plate member 32, and forms a cancel oil chamber 35 between the piston 29 and the cancel plate 30, which is located on the opposite side to the plate member 32 with respect to the piston 29.

Moreover, the hydraulic servo 20 of the third clutch C3 has the clutch drum 25, a piston 36, a cancel plate 37, and a return spring 39. The hydraulic servo 20 forms a hydraulic oil chamber 40 between the piston 36 and the clutch drum 25, and forms a cancel oil chamber 41 between the piston 36 and the cancel plate 37, which is located on the opposite side to the clutch drum 25 with respect to the piston 36.

Note that the friction plates 19, 21 which spline-engage with the clutch drums 25, 26 are axially positioned by snap rings 34, 38 which are fit on the inner peripheral sides of the drum portions 25c, 26c, respectively.

Moreover, the inner friction plates 19b of the friction plate 19 spline-engage with a clutch hub 42. The clutch hub 42 is connected to the first ring gear R1 of the planetary gear DP (see FIG. 1). That is, the reduced rotation is input to the inner friction plates 19b of the friction plate 19. Moreover, a brake band of the first brake B1 is provided around the outer peripheral side of the drum portion 25c.

On the other hand, the inner friction plates 21b of the friction plate 21 spline-engage with a clutch hub 43. The clutch hub 43 is connected to the first carrier CR1 of the planetary gear DP (see FIG. 1). That is, the input rotation is input to the inner friction plates 21b of the friction plate 21.

The plate member 32 of the fourth clutch C4 is provided between the clutch drum 26 and the piston 29. An inner peripheral portion of the plate member 32 is supported by the boss portion 27 of the clutch drum 26, and an outer peripheral portion of the plate member 32 is welded to the inner periphery of the cylindrical portion 26b of the clutch drum 26. Moreover, a seal ring a1 is provided between the plate member 32 and the boss portion 27 of the clutch drum 26 in an oil-tight manner, and a gap 32a extending in a planar manner is formed between the plate member 32 and the clutch drum 26.

The inner peripheral portion of the piston 29 is slidably supported by the boss portion 27 of the clutch drum 26. The piston 29 and the boss portion 27 are sealed by a seal ring a2, and the piston 29 and the plate member 32 are sealed by a seal ring a3, thereby forming the hydraulic oil chamber 33 in an oil-tight manner.

Moreover, the inner peripheral surface of the cancel plate 30 is supported by the boss portion 27 of the clutch drum 26. The return spring 31 is interposed between the cancel plate 30 and the piston 29, and a snap ring 44 receives the biasing force of the return spring 31. That is, the cancel plate 30 is axially fixedly positioned by the snap ring 44. Moreover, the cancel plate 30 and the piston 29 are sealed by a seal ring a5, thereby forming the cancel oil chamber 35 in an oil-tight manner.

Note that, the plate member 32 is a member formed by, for example, press-forming a thin iron plate, and has a first protrusion 32b protruding toward the piston, and a second protrusion 32c protruding toward the clutch drum. The first protrusion 32b and the second protrusion 32c are disposed at different positions on the same diameter in a phase-shifted manner.

On the other hand, the inner peripheral portion of the piston 36 of the third clutch C3 is supported by the cylindrical portion 26b of the clutch drum 26 of the fourth clutch C4, and the piston 36 is formed so as to be slidable on the outer periphery of the cylindrical portion 26b. The piston 36 and the cylindrical portion 26b of the clutch drum 26 are sealed by a seal ring a6, and the piston 36 and the clutch drum 25 are sealed by a seal ring a7, whereby the hydraulic oil chamber 40 of the third clutch C3 is held in an oil-tight state.

The cylindrical portion 26b and the flange portion 26a of the clutch drum 26 of the fourth clutch C4 are formed with a larger thickness than that of the plate member 32, thereby retaining the rigidity of the clutch drum 26. Moreover, in the clutch drum 26 of the fourth clutch C4, the drum portion 26c is located on the outer diameter side as compared to the cylindrical portion 26c, and a step portion is formed between the cylindrical portion 26b and the drum portion 26c which are formed integrally.

Moreover, the inner peripheral portion of the cancel plate 37 of the third clutch C3 is also supported by the cylindrical portion 26b of the clutch drum 26 of the fourth clutch C4, and the return spring 39 is interposed between the cancel plate 37 and the piston 36. The cancel plate 37 is pressed against the step portion between the cylindrical portion 26b and the drum portion 26c by the biasing force of the return spring 39, whereby the cancel plate 37 is axially fixedly positioned. Moreover, the cancel plate 37 and the piston 36 are sealed by a seal ring a8.

Note that the plate member 32 may be press-fitted in the inner periphery of the clutch drum 26 of the fourth clutch C4, and fixed by a snap ring. At this time, an oil seal is provided between the plate member 32, and the inner periphery of the cylindrical portion 26b and the outer periphery of the boss portion 27, whereby the gap 32a is held in an oil-tight state.

The oil passage structure regarding the third clutch C3 and the fourth clutch C4 will be described below with reference to FIG. 3.

An oil that is supplied to the hydraulic oil chamber 40 of the hydraulic servo 20 of the third clutch C3, that is, a hydraulic oil pressure of the third clutch C3, is guided from a hydraulic control device (valve body), which is not shown, via an oil passage formed in the oil pump body and the like, to an oil passage c1 formed in the boss portion 6a.

The oil passage c1 communicates with an oil passage c2 formed toward the outer peripheral side, is sealed by seal rings a9, a10, and communicates with a through hole 23a of the sleeve member 23. The though hole 23a communicates with an oil passage c3 formed between the sleeve member 23 and the boss portion 27 of the clutch drums 25, 26, and further communicates with a through hole 27a formed so as to extend and penetrate from the inner peripheral surface of the boss portion 27 of the clutch drums 25, 26 to the front surface (the surface on the right side in the drawing) of the flange portion 26a of the clutch drum 26. Moreover, the through hole 27a communicates with an oil passage c5 formed between the flange portion 26a of the clutch drum 26 of the fourth clutch C4 and the flange portion 25a of the clutch drum 25 of the third clutch C3. The oil passage c5 communicates with the hydraulic oil chamber 40.

Note that, in the present embodiment, an "oil passage for supplying a hydraulic oil pressure of the third clutch C3" indicates the oil passage c1, the oil passage c2, the through hole 23a of the sleeve member 23, the oil passage c3, the through hole 27a, and the oil passage c5, and the "hydraulic oil chamber 40" indicates a portion which is located on the outer peripheral side of the outer peripheral surface of the cylindrical portion 26b of the clutch drum 26 of the fourth clutch C4, and corresponds to the chamber area that presses the piston 36.

On the other hand, an oil that is supplied to the hydraulic oil chamber 33 of the hydraulic servo 22 of the fourth clutch C4, that is, a hydraulic oil pressure of the fourth clutch C4, is guided from the hydraulic control device (valve body), which is not shown, via an oil passage formed in the oil pump body and the like, to an oil passage c6 formed in the boss portion 6a.

The oil passage c6 communicates with an oil passage c7 formed toward the outer periphery, and is sealed by seal rings a11, a12 to communicate with a through hole 23b of the sleeve member 23. The through hole 23b communicates with an oil passage c8 formed between the sleeve member 23 and the boss portion 27 of the clutch drums 25, 26, and further communicates with a through hole 27b formed so as to extend from the inner peripheral surface of the boss portion 27 of the clutch drums 25, 26 to the outer peripheral surface of the boss portion 27. An outlet of the through hole 27b on the outer peripheral side communicates with the hydraulic oil chamber 33.

Note that, in the present embodiment, an "oil passage for supplying a hydraulic oil pressure of the fourth clutch C4" indicates the oil passage c6, the oil passage c7, the through hole 23b of the sleeve member 23, the oil passage c8, and the through hole 27b, and the "hydraulic oil chamber 33" indicates a portion which is located on the outer peripheral side of the boss portion 27 of the clutch drums 25, 26, and corresponds to the chamber area that presses the piston 29.

Moreover, for example, an oil that is supplied as a lubricant is used as an oil that is supplied to the cancel oil chambers 35, 41 of the third clutch C3 and the fourth clutch C4, and is guided from the hydraulic control device (valve body), not shown, through an oil passage formed in the oil pump body and the like, to an oil passage d1 formed in the boss portion 6a.

The oil passage d1 communicates with an oil passage d2 formed toward the outer periphery, and is sealed by the seal rings a10, a11 to communicate with a through hole 23c of the sleeve member 23. The through hole 23c communicates with an oil passage d3 formed between the sleeve member 23 and the boss portion 27 of the clutch drums 25, 26. The oil passage d3 communicates with a through hole 27c formed so as to extend from the inner peripheral surface of the boss portion 27 of the clutch drums 25, 26 to the outer peripheral surface of the boss portion 27. An outlet of the through hole 27c on the outer peripheral side communicates with the cancel oil chamber 35 of the fourth clutch C4.

On the other hand, the oil passage d3 communicates also with an oil gallery 27d formed so as to extend and penetrate through the boss portion 27 of the clutch drums 25, 26. The oil gallery 27d communicates with the predetermined gap 32a described above which extends in a planar manner between the plate member 32 and the clutch drum 26. Moreover, the gap 32a communicates with a through hole 26d formed in the cylindrical portion 26b of the clutch drum 26 of the fourth clutch C4, and an outlet of the through hole 26d on the outer peripheral side communicates with the cancel oil chamber 41 of the third clutch C3.

Note that, in the present embodiment, an "oil passage of the cancel oil chamber 35 of the fourth clutch C4" indicates the oil passage d1, the oil passage d2, the through hole 23c of the sleeve member 23, the oil passage d3, and the through hole 27c, and the "cancel oil chamber 35" indicates a portion which is located on the outer peripheral side of the outer peripheral surface of the boss portion 27 of the clutch drums 25, 26, and corresponds to an effective area that applies a centrifugal oil pressure to the piston 29. Moreover, an "oil passage 46 of the cancel oil chamber 41 of the third clutch C3" indicates the oil passage d1, the oil passage d2, the through hole 23c of the sleeve member 23, the oil passage d3, the oil gallery 27d, the gap 32a, and the through hole 26d, and the "the cancel oil chamber 41" indicates a portion which is located on the outer peripheral side of the outer peripheral surface of the cylindrical portion 26b of the clutch drum 26 of the fourth clutch C4, and corresponds to an effective area that applies a centrifugal oil pressure to the piston 36.

Operation of the third clutch C3 and the fourth clutch C4 will be described below.

When it is determined that the fourth clutch C4 has been engaged from a disengaged state, an engaging pressure is supplied from the hydraulic control device, not shown, to the hydraulic oil chamber 33 of the fourth clutch C4, and the piston 29 slides on the boss portion 27 of the clutch drum 26 against the biasing force of the return spring 31, and is driven rearward to press and engage the friction plate 21.

At this time, the rearward (leftward in the drawing) pressing force of the piston 29 by the engaging pressure of the hydraulic oil chamber 33 is transmitted to the drum portion 26c of the clutch drum 26 through the friction plate 21 and the snap ring 38. This rearward (leftward in the drawing) pressing force generated in the clutch drum 26, and the forward (rightward in the drawing) pressing force that is generated in the plate member 32, which serves as a cylinder of the piston 29, by the engaging pressure of the hydraulic oil chamber 33 cancel each other.

Moreover, when the fourth clutch C4 is disengaged, the piston 29 is pushed back forward by the return spring 31. Since the piston 29 contacts the clutch drum 26 with the plate member 32 interposed therebetween, this biasing force of the return spring 31 and the rearward pressing force that is generated in the clutch drum 26 through the cancel plate 30 and the snap ring 44 cancel each other.

At this time, even if the hydraulic servo 22 of the fourth clutch C4 is rotating, the centrifugal oil pressures based on the centrifugal force, which are generated in the oil in the hydraulic oil chamber 33 and the oil in the cancel oil chamber 35, are applied to the piston 29 in such a direction that the centrifugal oil pressures cancel each other. Moreover, the centrifugal oil pressure that presses the clutch drum 26 forward and the centrifugal oil pressure that presses the cancel plate 30 rearward cancel each other in a manner similar to that described above. That is, the centrifugal oil pressure that is generated in the hydraulic servo 22 is completely cancelled.

On the other hand, when it is determined that the third clutch C3 has been engaged from a disengaged state, an engaging pressure is supplied from the hydraulic control device, not shown, to the hydraulic oil chamber 40 of the third clutch C3, and the piston 36 slides on the clutch drum 26 of the fourth clutch C4 against the biasing force of the return spring 39, and is driven rearward to press and engage the friction plate 19.

At this time, the rearward (leftward in the drawing) pressing force of the piston 36 by the engaging pressure of the hydraulic oil chamber 40 is transmitted to the drum portion 25c of the clutch drum 25 through the friction plate 19 and the snap ring 34. This force, and the forward (rightward in the drawing) pressing force that is generated in a cylinder portion of the clutch drum 25 by the engaging pressure of the hydraulic oil chamber 40 cancel each other.

Moreover, when the third clutch C3 is disengaged, the piston 36 is pushed back forward by the return spring 39. Since the piston 36 is brought into contact with the clutch drum 25, this biasing force of the return spring 39 is cancelled. At this time, if the hydraulic servo 20 of the third clutch C3 is rotating, the lubricant is supplied by the centrifugal force, from the oil gallery 27d of the common boss portion 27 of the clutch drums 25, 26 to the gap 32a that extends in a planar manner between the plate member 32 and the clutch drum 26.

The lubricant supplied to the gap 32a is supplied to the cancel oil chamber 41 through the through hole 26d formed in the cylindrical portion 26b of the clutch drum 26, and the centrifugal oil pressure that is generated in the oil in the cancel oil chamber 41 and the centrifugal oil pressure that is generated in the oil in the hydraulic oil chamber 40 are applied to the piston 36 so as to cancel each other. Moreover, the centrifugal oil pressure that presses the clutch drum 25 forward and the centrifugal oil pressure that presses the cancel plate 37 rearward cancel each other in a manner similar to that described above.

At this time, the drum portion 26c of the clutch drum 26 is strongly pressed rearward by the centrifugal oil pressure generated in the cancel plate 37 and the like. However, since the cylindrical portion 26b and the flange portion 26a are formed with a large thickness to have high rigidity, almost no deformation is produced.

Since the automatic transmission 1 is structured as described above, the lubricant is supplied to the cancel oil chamber 41 of the third clutch C3 via the planar gap 32a formed between the plate member 32 and the clutch drum 26, whereby no oil gallery needs to be formed in the sliding piston 29. Thus, the number of seal members, such as O-rings, is reduced, and the axial dimension of the piston 29, the plate member 32 which serves as a cylinder of the piston 29, and the like is reduced, whereby the clutches C4, C3 and the automatic transmission 1 can be reduced in dimensions.

Moreover, since an oil is supplied through the gap 32a that extends in a planar manner, the space for supplying the oil can be short in the axial dimension, whereby the axial dimension of the clutches C3, C4 can further be reduced, and the oil passage 46 can be easily formed.

Moreover, the cancel oil chamber 41 of the third clutch C3 is formed on the outer periphery of the clutch drum 26 of the fourth clutch C4, and the cancel plate 37 that forms the cancel oil chamber 41 is latched by being pressed against the step portion between the cylindrical portion 26b and the drum portion 26c of the clutch drum 26. Thus, no snap ring is required to latch the cancel plate. 37, whereby the axial dimension of the clutches C3, C4 can be reduced.

Moreover, since the cylindrical portion 26b and the flange portion 26a of the clutch drum 26 of the fourth clutch C4 are formed with a large thickness to have high rigidity, the plate member 32 can be formed with a small thickness by a press forming method, and therefore the axial dimension can be reduced.

Moreover, the fourth clutch C4 and the third clutch C3 are disposed adjacent to each other, whereby formation of the oil passage structure is facilitated.

Second Embodiment

Figure 4:
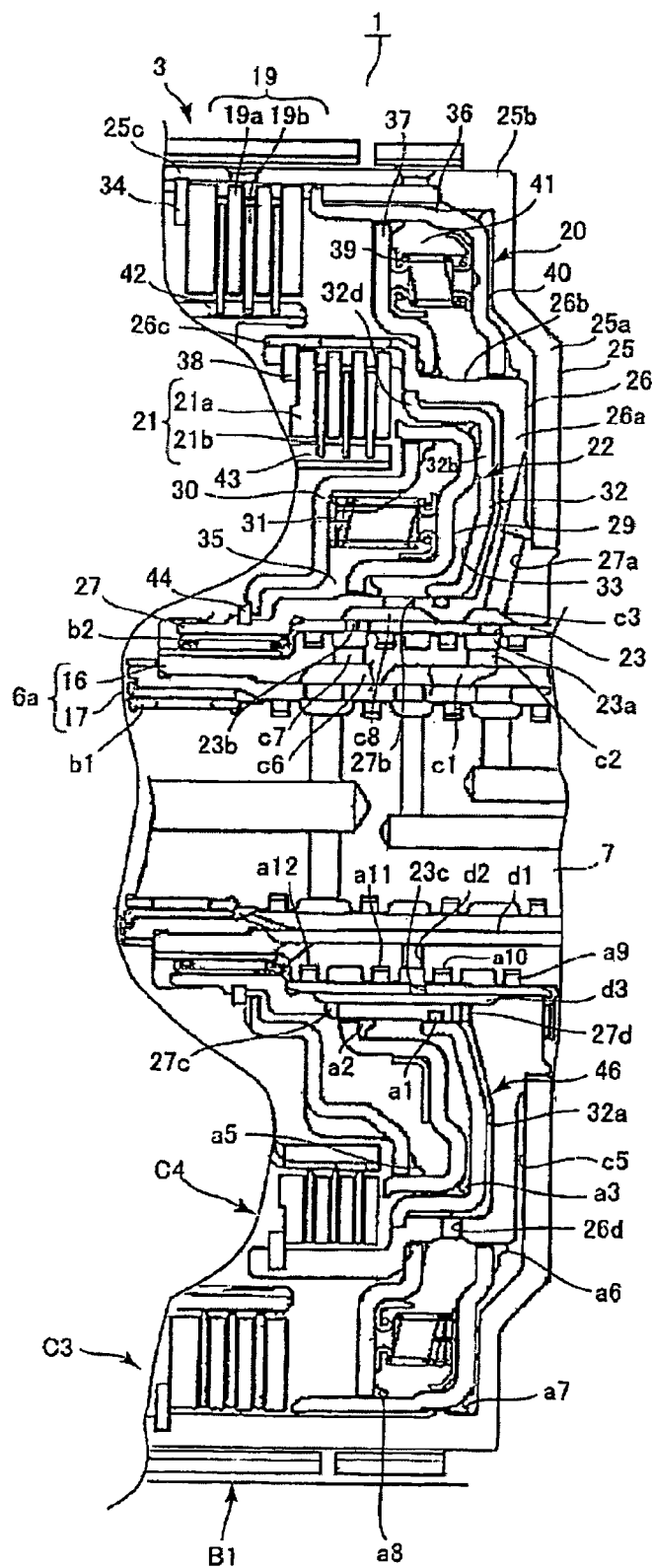
FIG. 4 is a partial enlarged cross-sectional view showing an automatic transmission according to a second embodiment of the present invention.

FIG. 4 shows an automatic transmission 1 of a second embodiment of the present invention. The shape of the plate member 32 in the first embodiment is modified in this embodiment. The differences from the structure of the first embodiment will be described below.

The plate member 32 is formed so as to have a bent tip portion 32d that is welded to the clutch drum 26. The plate member 32 is welded in the state where this tip portion 32d is pressed against the inner peripheral surface of the clutch drum 26. Thus, the plate member 32 can be easily positioned, and the clearance of the gap 32a between the plate member 32 and the clutch drum 26 can always be maintained constant.

Third Embodiment

Figure 5:
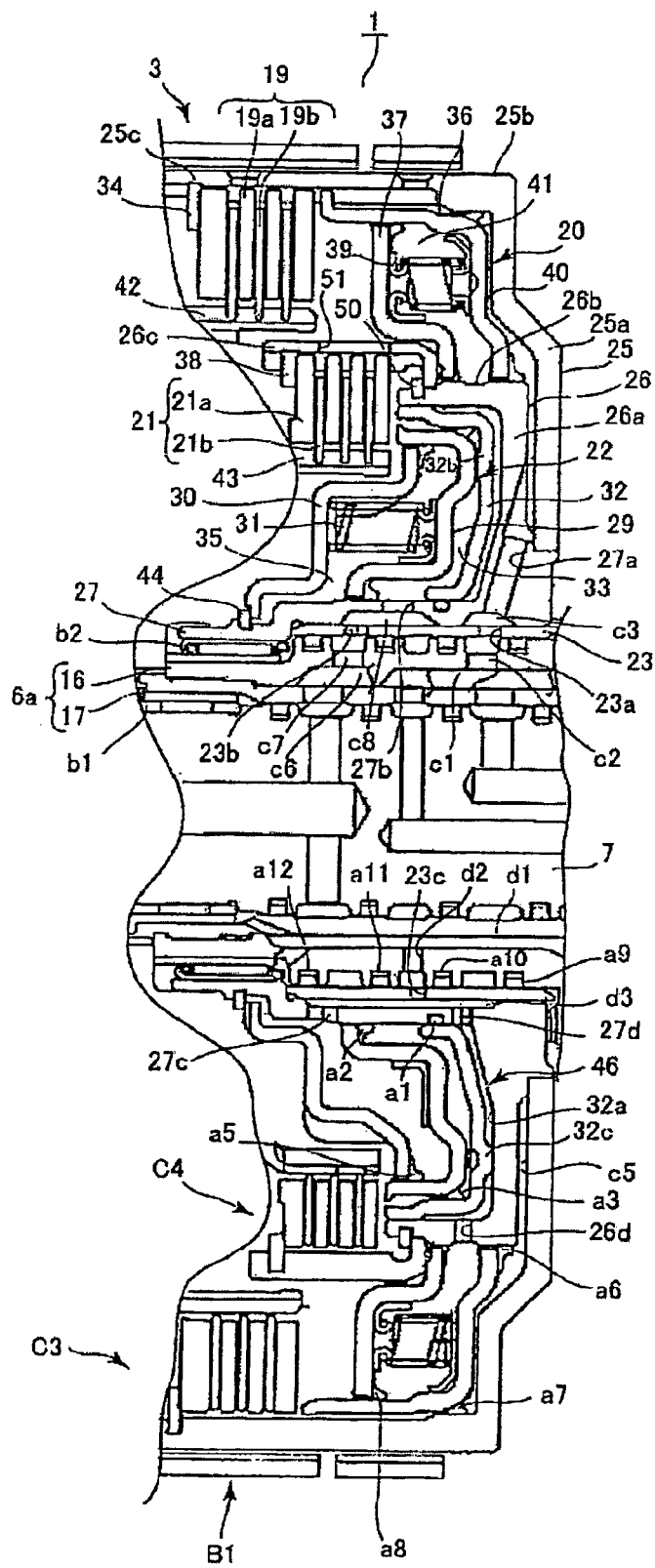
FIG. 5 is a partial enlarged cross-sectional view showing an automatic transmission according to a third embodiment of the present invention.

FIG. 5 shows an automatic transmission 1 of a third embodiment of the present invention. In this embodiment, the drum portion 26c of the clutch drum 26 in the first embodiment is formed separately. The differences from the structure of the first embodiment will be described below.

In the clutch drum 26 of the fourth clutch C4, the cylindrical portion 26b and the drum portion 26c are formed separately. The drum portion 26c spline-engages with the outer periphery of the cylindrical portion 26b, and is latched by a snap ring (a restricting member) 50. Moreover, the cancel plate 37 of the third clutch C3 is pressed against the drum portion 26c by the biasing force of the return spring 39, and the snap ring 50 fixedly positions the cancel plate 37 and the drum portion 26c.

Thus, as compared to the clutch drum in which the drum portion 26c and the cylindrical portion 26b are formed integrally, even if a large pressing force is generated in the drum portion 26c by the centrifugal oil pressure as described above, the connection portion of the cylindrical portion 26b located on the outer peripheral side of the clutch C4 can serve as a fulcrum of a moment, whereby the drum portion 26c having an oil gallery 51 for lubrication can be prevented from being subjected to a large torsional moment. Thus, clutch controllability can be improved without adversely affecting the posture of the friction plate 21. Moreover, since partial contact of the friction plate 21 does not occur, durability can also be improved.

The automatic transmission of the present invention can be used in vehicles such as passenger cars, trucks, buses, and agricultural machines, and is preferably used for an automatic transmission which is required to be compact in axial length, and is especially suitable for an automatic transmission capable of multi-speed shifting, which is used in a FF-type vehicle and required to be compact in axial length.

What is claimed is:

1. An automatic transmission, comprising
first and second clutches provided at different radial positions so as to axially overlap each other, each of the first and second clutches including
a clutch drum,
a piston disposed in the clutch drum,
a plurality of friction plates engaging with the clutch drum,
a hydraulic oil chamber of the piston,
a cancel oil chamber that is provided so as to face the hydraulic oil chamber with the piston interposed therebetween, and cancels a centrifugal oil pressure that is applied to the hydraulic oil chamber,
a return spring that biases the piston toward the hydraulic oil chamber, and
a cancel plate that forms the cancel oil chamber between the cancel plate and the piston, and receives a reaction force of the return spring, wherein
a plate member that forms a cylinder portion of the hydraulic oil chamber is provided between the piston and the clutch drum of the first clutch that is located on an inner diameter side, and
an oil passage that supplies an oil to the cancel oil chamber of the second clutch that is located on an outer diameter side is formed between the clutch drum and the plate member.

2. The automatic transmission according to claim 1, wherein
the clutch drum of the first clutch has a boss portion, a flange portion extended from the boss portion to a circumferential direction, a cylindrical portion extending from the flange portion to an axial direction, and a drum portion with which the friction plates spline-engage on a tip side of the cylindrical portion, and
the piston and the cancel plate, which form the cancel oil chamber of the second clutch, are provided on an outer periphery of the cylindrical portion.

3. The automatic transmission according to claim 2, wherein
the clutch drum of the first clutch has the drum portion located on an outer diameter side as compared to the cylindrical portion, and has a step portion between the drum portion and the cylindrical portion, and the cancel plate of the second clutch is latched by being pressed against the step portion between the drum portion and the cylindrical portion.

4. The automatic transmission according to claim 2, wherein the drum portion and the cylindrical portion of the clutch drum of the first clutch are formed separately, and the drum portion is latched to the cylindrical portion by a restricting member.

5. The automatic transmission according to claim 2, wherein the oil passage has a gap between the clutch drum of the first clutch and the plate member, an oil gallery that is formed in the boss portion of the clutch drum, and supplies the oil to the gap, and an oil gallery that is formed in the cylindrical portion of the clutch drum, and supplies the oil from the gap to the cancel oil chamber of the second clutch.

6. The automatic transmission according to claim 2, wherein the clutch drum of the first clutch is formed so that the cylindrical portion and the flange portion have a larger thickness than that of the plate member.

7. The automatic transmission according to claim 1, wherein the plate member is welded to the cylindrical portion of the clutch drum of the first clutch.

8. The automatic transmission according to claim 1, wherein the plate member is press-formed so as to have a first protrusion protruding toward the piston, and a second protrusion protruding toward the clutch drum, and the first and second protrusions are disposed at different positions on a same diameter in a phase-shifted manner.

* * * * *